US012300457B2

(12) United States Patent
Stoner et al.

(10) Patent No.: US 12,300,457 B2
(45) Date of Patent: May 13, 2025

(54) SWITCH ACTUATOR

(71) Applicant: Sensata Technologies, Inc., Attleboro, MA (US)

(72) Inventors: Michael A. Stoner, Eden Prairie, MN (US); Jeffrey M. Smith, New Prague, MN (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 302 days.

(21) Appl. No.: 17/939,208

(22) Filed: Sep. 7, 2022

(65) Prior Publication Data

US 2023/0123429 A1 Apr. 20, 2023

Related U.S. Application Data

(60) Provisional application No. 63/242,580, filed on Sep. 10, 2021.

(51) Int. Cl.

| | |
|---|---|
| ***H01H 9/06*** | (2006.01) |
| ***G05G 1/06*** | (2006.01) |
| ***H01H 25/04*** | (2006.01) |

(52) U.S. Cl.

CPC ............... *H01H 9/061* (2013.01); *G05G 1/06* (2013.01); *H01H 25/04* (2013.01); *H01H 2025/048* (2013.01)

(58) Field of Classification Search

CPC .... H01H 25/00; H01H 25/04; H01H 2025/00; H01H 2025/04; H01H 2025/048; H01H 3/00; H01H 3/02; H01H 3/12; H01H 13/50; H01H 2221/00; H01H 2221/008; H01H 2221/012; H01H 2221/016; H01H 2221/09; H01H 2223/01; H01H 2223/00; H01H 9/061; H01H 9/02; H01H 9/0214; H01H 9/06; G05G 1/06

USPC .......................................................... 200/237

See application file for complete search history.

(56) References Cited

U.S. PATENT DOCUMENTS

2014/0268628 A1* 9/2014 Mann .................... G08C 17/02
361/752

* cited by examiner

*Primary Examiner* — Anthony R Jimenez
(74) *Attorney, Agent, or Firm* — Mark H. Whittenberger; Holland & Knight LLP

(57) ABSTRACT

Embodiments included herein are directed towards an apparatus for actuating a switch of an operator control device, and related methods. Embodiments of the present disclosure may include a trigger shaped to mate with the operator control device. The trigger may include an integrated preload portion formed, at least in part, within the trigger. The trigger may further include an integrated actuator portion formed, at least in part, at an interfacing portion of the trigger. The integrated actuator portion may be configured to interface with the switch of the operator control device.

18 Claims, 14 Drawing Sheets

SWITCH ACTUATOR

CROSS REFERENCE TO RELATED APPLICATIONS

This application claims the benefit of U.S. Provisional Patent Application having Ser. No. 63/242,580, filed 10 Sep. 2021, the entire content of which is incorporated herein by reference.

BACKGROUND

Switches may be used in various industries to control machinery or equipment. The switches may be actuated in various ways, including by other components and/or by hand. In some cases, a switch may be part of a device, such as a joystick or other input device. The device incorporating the switch may have various components, including one or more components for actuating the switch, which may require various hardware or other fasteners to be assembled. Thus, such devices may become expensive to manufacture and assemble, and the various components and hardware may add complexity and cost.

SUMMARY OF THE DISCLOSURE

As will be discussed in greater detail below, embodiments of the present disclosure are directed towards an apparatus for actuating a switch of an operator control device, and related methods. Embodiments of the present disclosure may include a trigger shaped to mate with the operator control device. The trigger may include an integrated preload portion formed, at least in part, within the trigger. The trigger may further include an integrated actuator portion formed, at least in part, at an interfacing portion of the trigger. The integrated actuator portion may be configured to interface with the switch of the operator control device.

Some or all of the following features may be included. The apparatus may include an integrated rotation portion formed, at least in part, at a first end of the trigger. The apparatus may further include a first mating portion formed at a first end of the trigger and shaped to allow the trigger to mate with the operator control device. The apparatus may also include a second mating portion formed at a second end of the trigger opposite the first end of the trigger and shaped to allow the trigger to mate with the operator control device. The integrated rotation portion may be configured to interface with, at least in part, a pivot portion of the operator control device. The integrated rotation portion may be configured to allow at least a portion of the trigger to rotate around the pivot portion of the operator control device upon the trigger being mated to the operator control device. The integrated actuator portion may be configured to apply pressure to the switch of the operator control device upon pressure being exerted on the trigger. The integrated actuator portion may be configured to actuate the switch of the operator control device upon pressure being exerted on the trigger. The integrated actuator portion may be configured to contact the integrated preload portion upon pressure being exerted on the trigger.

In embodiments, a change in a spring rate of the integrated preload portion may be caused by the contact of the integrated actuator portion with the integrated preload portion. The change in the spring rate of the integrated preload portion may be detectable by an operator of the operator control device. At least a first portion of the trigger, the integrated rotation portion, the integrated actuator portion, and the integrated preload portion may rotate upon pressure being exerted on the trigger. The trigger may be formed from an elastomeric material. An elastomeric property of the trigger may provide flexibility for the trigger to be snapped into position in a trigger opening of the operator control device. The trigger and the integrated preload portion may be a single part. The trigger and the integrated preload portion may be formed from a single piece of elastomeric material. The trigger may not require a separate component to mate with the operator control device.

In an embodiment, a method for forming an apparatus for actuating a switch of an operator control device may include forming a trigger shaped to mate with the operator control device. The method may further include forming an integrated preload portion of the trigger, at least in part, within the trigger. The method may also include forming an integrated actuator portion of the trigger, at least in part, at an interfacing portion of the trigger. The integrated actuator portion may be configured to interface with the switch of the operator control device.

Some or all of the following features may be included. The method may include forming an integrated rotation portion of the trigger, at least in part, at a first end of the trigger. The trigger and the integrated preload portion may be formed from a single piece of elastomeric material. The trigger may not require a separate component to mate with the operator control device In an embodiment, an apparatus for actuating a switch of an operator control device may include a trigger shaped to mate with the operator control device. The trigger may include an integrated preload portion formed, at least in part, within the trigger. The trigger may further include an integrated actuator portion formed, at least in part, at an interfacing portion of the trigger. The trigger may also include an integrated rotation portion formed, at least in part, at a first end of the trigger. The trigger may additionally include at least one mating portion shaped to allow the trigger to mate with the operator control device. The integrated rotation portion may be configured to allow at least a portion of the trigger to rotate around a pivot portion of the operator control device upon pressure being exerted on the trigger and cause the integrated actuator portion to actuate the switch of the operator control device.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the embodiments and/or implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Figure 1:
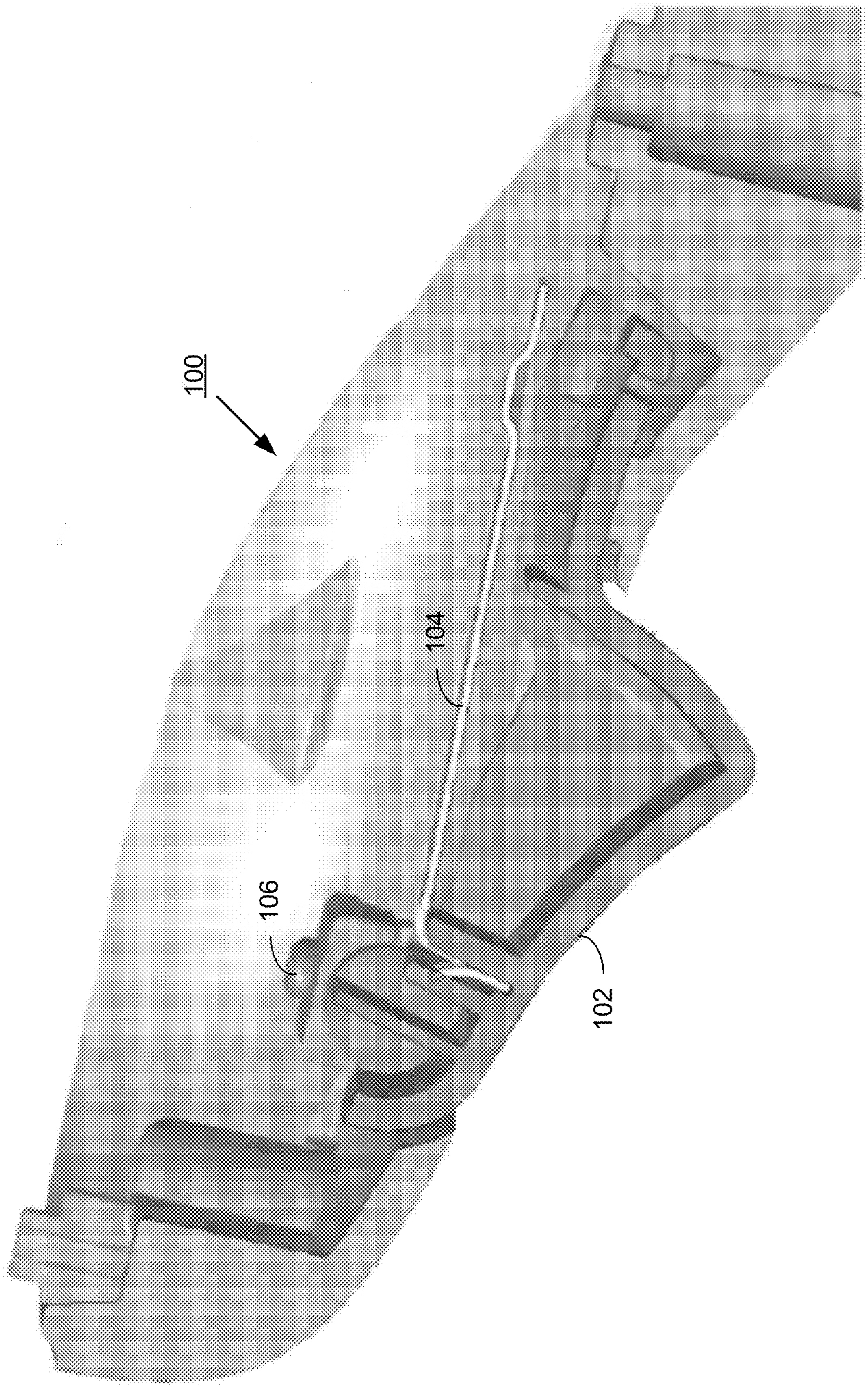
FIG. 1 illustrates a cross-sectional view of an example grip.

Referring to FIG. 1 a cross-sectional view of an example grip 100 (e.g. a joystick grip or grip of a control device) is illustrated. The grip 100 may be a standard grip with a trigger 102 and a steel leaf spring (e.g., spring 104) for preload and dual-rate actuation. The spring 104 may be a preload spring, which may typically be used in a trigger design (e.g., trigger 102) to prevent free-play in the grip/trigger mechanism and allow for dual-rate actuation (as may be illustrated by a dual-rate actuation performance curve). This may be referred to as a preload spring function. The trigger 102 may be mated or secured to the grip 100 by one or more fasteners (e.g., fastener 106). The grip 100 may include a switch that may be actuated by the trigger 102.

Figure 2:
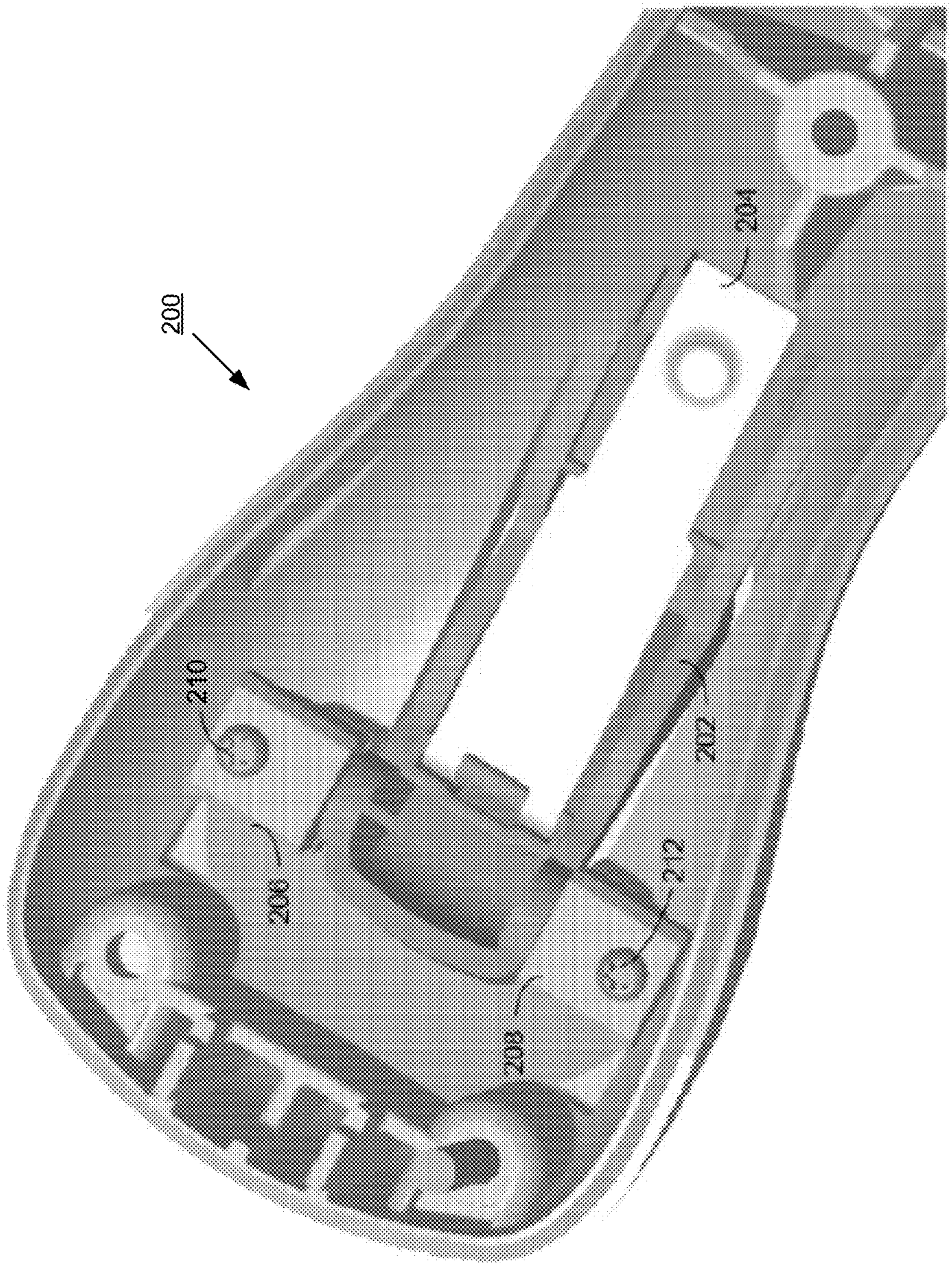
FIG. 2 illustrates an interior view of an example grip.

Referring to FIG. 2, an interior view of an example grip 200 is illustrated. The grip 200 may be a standard grip with a trigger 202 and a steel leaf spring (e.g., spring 204) for preload and dual-rate actuation. This example grip 200 shows a variation including two trigger retainers 206 and 208 held in place by two screws 210 and 212. Thus, the total part and/or component count for the trigger 202, including for mating or securing the trigger 202 to the grip 200, may be six parts and/or components (e.g., the trigger 202, the spring 204, the retainers 206 and 208, and the screws 210 and 212). A trigger axle of the grip 200 may include the trigger retainers 206 and 208 and the trigger 202 may rotate on a portion in contact with the trigger retainers. The trigger 202 may be preloaded with the steel leaf spring 204, which may provide a preload spring function. The grip 200 may include a switch that may be actuated by the trigger 202.

Embodiments of the present disclosure may include a trigger/actuator for actuating a switch. The trigger/actuator may be formed from an elastomeric material. The elastomeric material may enable the trigger/actuator to have integral features that may generate a preload (e.g., provide a preload spring function) without a separate spring (e.g., without a steel leaf spring 104 or 204 as described above regarding FIG. 1 or FIG. 2, respectively). The trigger/actuator may be positioned in a joystick, grip (e.g., grip 100 or 200 as described above), or other operator control device. The elastomeric material may allow the trigger/actuator to flex easily such that the trigger/actuator may be snapped into a trigger opening in the joystick, grip, or other operator control device. This may eliminate a need for hold-down hardware (e.g., retainers 206 and 208 and/or screws 210 and 212 as described above regarding FIG. 2, or other fasteners), and may improve ease of assembly (e.g., manufacturing or forming the trigger/actuator and/or mating or securing the trigger/actuator to the operator control device). Further, the cost and quantity of parts and/or components for the trigger/actuator of an operator control device may be reduced by integrating multiple features into one part (i.e., the trigger) that requires little or no assembly.

For example, embodiments of the present disclosure may utilize an integrated spring-web feature to perform the preload spring function. As discussed above, the trigger/actuator may use elastomeric properties to allow flexibility for being snapped into position in a trigger opening of an operator control device, as snap-fits may be efficient for manufacturing/assembly of mating components (e.g., a trigger/actuator that mates with or is otherwise secured to an operator control device such as a joystick or a grip), and may improve production time. Thus, an operator control device may use a trigger/actuator made of elastomeric material to enable it to have integral features that generate preload without a separate spring, such that the cost and quantity of components for the trigger/actuator may be reduced (i.e., by integrating multiple features into one part or component). Embodiments of the present disclosure may include features built into a single piece of elastomer that forms the trigger, which may include a preload spring element, an actuator, a pivot/rotation feature, and/or snap-fit style mating features for assembly (e.g., for mating/securing the trigger with the operator control device).

Figure 3:
FIG. 3 illustrates a top view of an example operator control device having a trigger in accordance with embodiments of the present disclosure.
Figure 4:
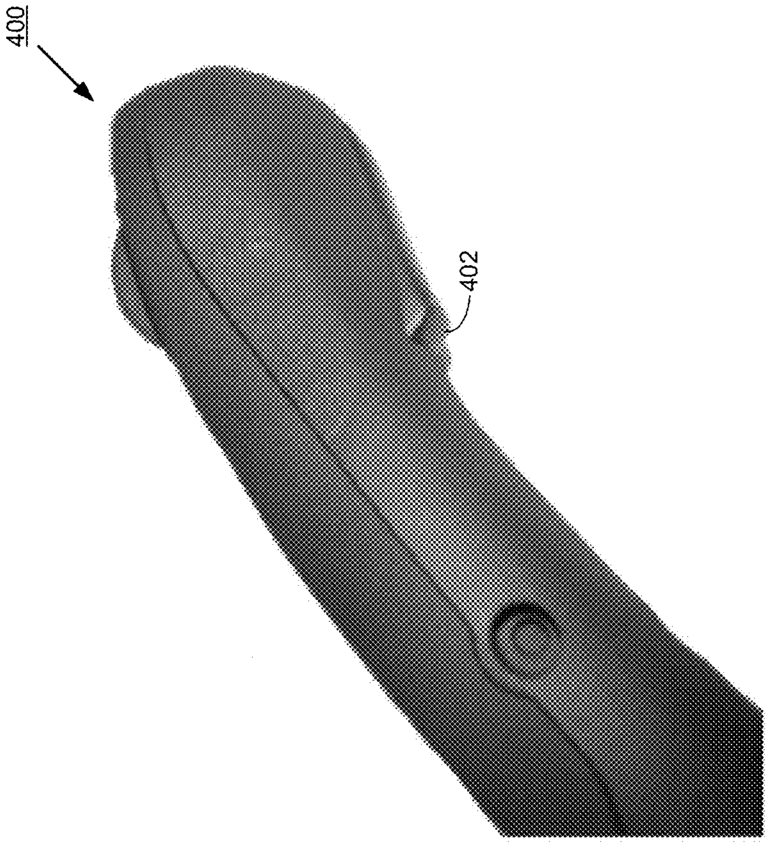
FIG. 4 illustrates a side view of an example operator control device having a trigger in accordance with embodiments of the present disclosure.

Referring to FIG. 3, a top view of an operator control device 300 having a trigger 302 in accordance with embodiments of the present disclosure is shown. The operator control device 300 may be a grip and may include the trigger 302. Referring to FIG. 4, a side view of an operator control device 400 having a trigger 402 in accordance with embodiments of the present disclosure is shown. The operator control device 400 may be a grip and may include the trigger 402. The trigger 302 and/or the trigger 402 may be constructed or formed from any suitable material, such as elastomeric materials. In some cases the trigger 302 or the trigger 402 may include one or more integrated portions which may be used to mate the trigger 302 or the trigger 402 together with the grip 300 or the grip 400, respectively. The grip (e.g., the grip 300 or the grip 400) may house a switch, as is discussed further below. The trigger (e.g., the trigger 302 or the trigger 402) may be incorporated into a housing of the grip (e.g., the grip 300 or the grip 400) and the housing may include multiple pieces or portions. In some embodiments, the grip (e.g., the grip 300 or the grip 400) itself may be the housing for the trigger (e.g., the trigger 302 or the trigger 402) and may be shaped as a joystick. The trigger (e.g., the trigger 302 or the trigger 402) may be configured to actuate the switch housed by the grip (e.g., the grip 300 or the grip 400).

Figure 5:
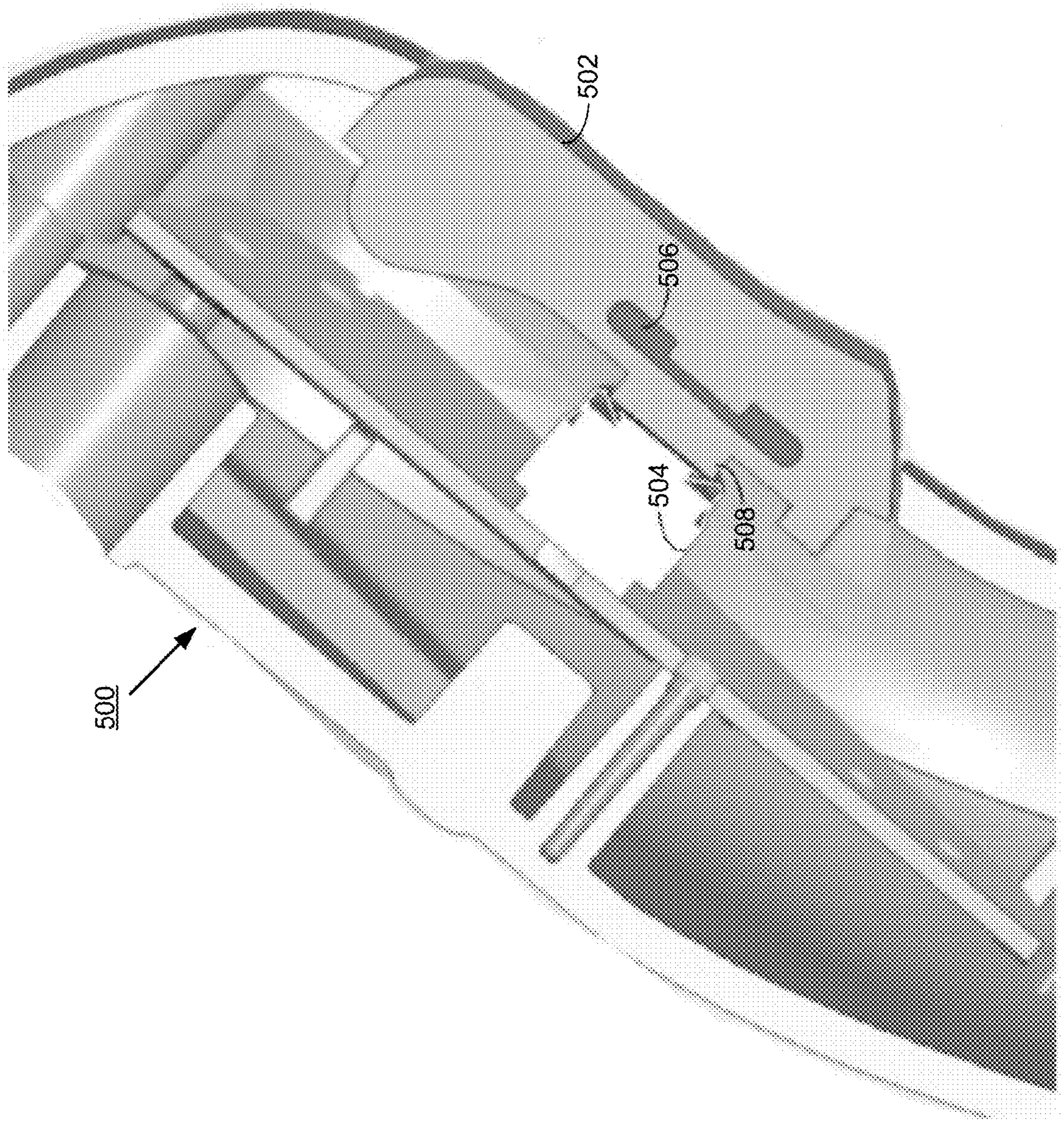
FIG. 5 illustrates a cross-sectional view of an example operator control device having a trigger in accordance with embodiments of the present disclosure.

Embodiments of the present disclosure may be directed towards an apparatus (e.g., a trigger such as trigger 302 or 402) for actuating a switch of an operator control device (e.g., grip 300 or 400), and related methods. For example, and referring to FIG. 5, a cross-sectional view of an operator control device 500 having a trigger 502 in accordance with embodiments of the present disclosure is illustrated. The operator control device 500 may have a trigger 502 and may be a grip or joystick. The trigger 502 may be shaped to mate with the operator control device 500. Further, the trigger 502 may be made from a elastomer and may be configured to contact a switch 504 (e.g., a pushbutton switch) housed by the operator control device 500. In operation, an operator may depress the trigger 502 or otherwise exert pressure on the trigger 502 (e.g., with a finger), which may enable the trigger 502 and switch 504 to make contact. In some embodiments, the trigger 502 may include a section surrounding a cavity 506. In operation, the section surrounding the cavity 506 may allow for additional finger travel while depressing the trigger 502 before the trigger 502 reaches the pushbutton switch 504. In embodiments where the trigger 502 is constructed or formed from flexible material(s), such as elastomers, the trigger 502 may be compressible.

Figure 6:
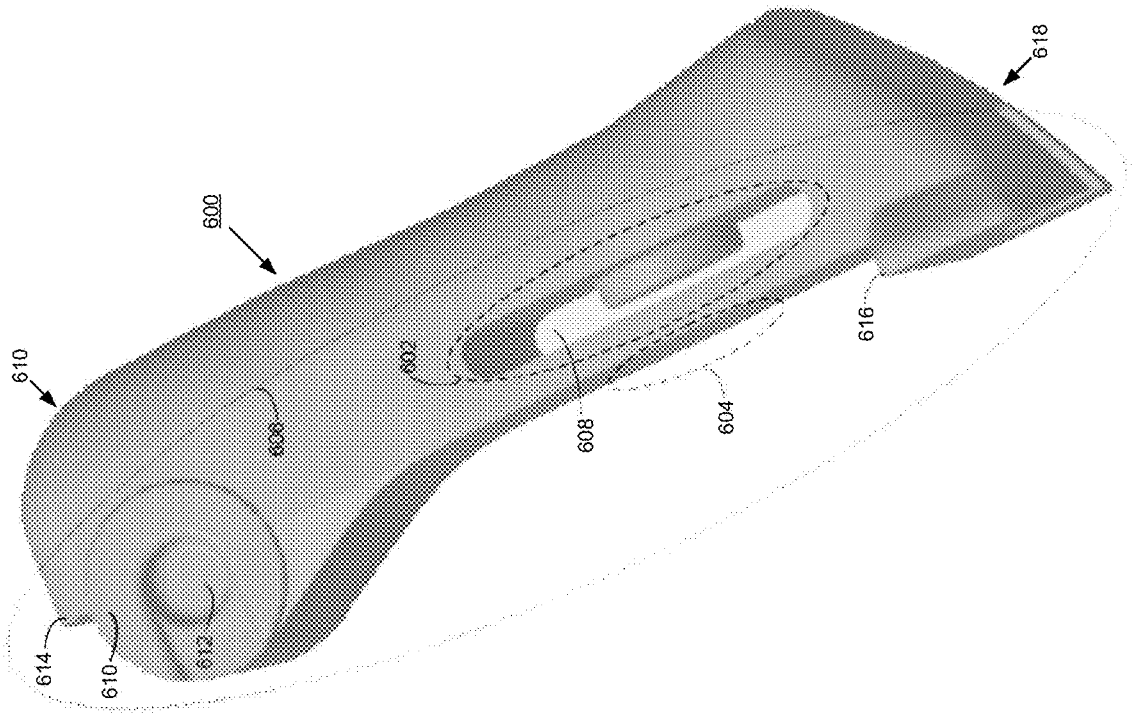
FIG. 6 illustrates an isometric view of an example trigger in accordance with embodiments of the present disclosure.

Referring to FIG. 6, an isometric view of a trigger 600 in accordance with embodiments of the present disclosure is illustrated. The trigger 600 may be made or formed from an elastomer and may be consistent with embodiments of the present disclosure. The trigger 600 may include an integrated preload portion 602 formed, at least in part, within the trigger 600. The integrated preload portion 602 may provide a preload spring feature as described above. In some embodiments, the trigger 600 may include a section surrounding a cavity 608, where the section surrounding the cavity 608 may provide, at least in part, the preload spring feature.

Further, the trigger may include an integrated actuator portion 604 formed, at least in part, at an interfacing portion 606 of the trigger 600. The interfacing portion 606 of the trigger 600 may be a portion of the trigger 600 that interfaces with an operator control device (e.g., the operator control device 500 of FIG. 5, where the trigger 502 may include an integrated actuator portion 508). The integrated actuator portion 604 may be configured to interface with a switch (e.g. switch 504) of an operator control device (e.g., the operator control device 500).

Also, the trigger 600 may include an integrated rotation portion 610 formed, at least in part, at a first end 610 of the trigger. The integrated rotation portion 610 may include a pivot interface 612. In some embodiments, the pivot interface 612 may be included elsewhere on the trigger 600. The pivot interface 612 may rotate about an axle, which may be part of an operator control device (e.g., the operator control device 500) that may interface with the pivot interface 612.

Additionally, the trigger 600 may include a first mating portion 614 formed at the first end 610 of the trigger. The first mating portion 614 that may be shaped to allow the trigger 600 to mate with an operator control device (e.g., the operator control device 500). The trigger 600 may also include a second mating portion 616 formed at a second end 618 of the trigger 600 opposite the first end 610 of the trigger 600. The second mating portion 616 may also be shaped to allow the trigger 600 to mate with the operator control device.

Figure 7:
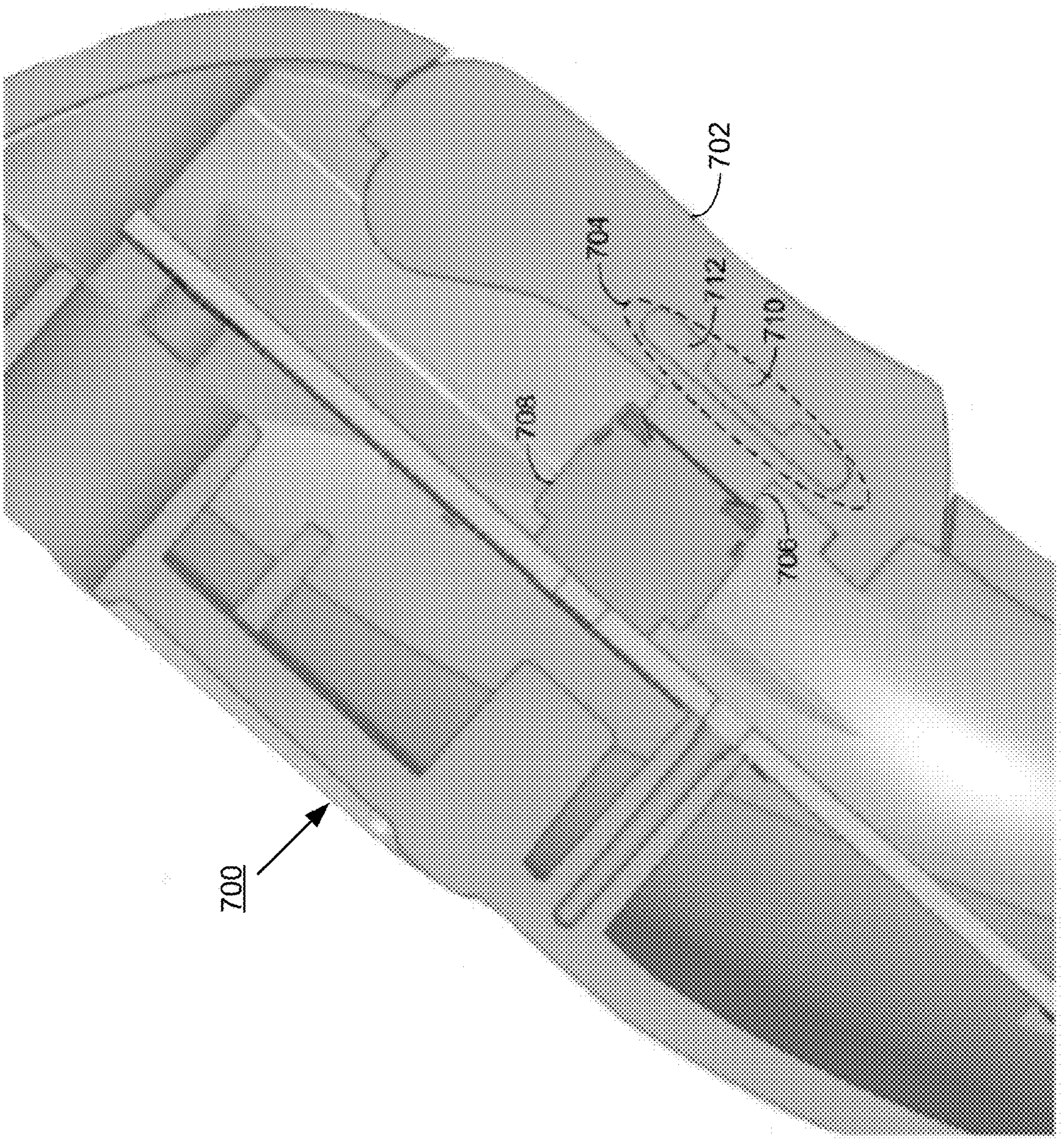
FIGS. 7-11 illustrate cross-sectional views of example operator control devices having triggers in accordance with embodiments of the present disclosure.

Referring to FIG. 7, a cross-sectional view of an operator control device 700 having a trigger 702 in accordance with embodiments of the present disclosure is illustrated. The trigger 702 may provide the preload spring feature as discussed above and the preload spring feature may be integrated into the trigger 702. In some embodiments, an integrated preload portion (e.g., integrated preload portion 704) may provide the preload spring feature as described above. For example, a change in a spring rate of the integrated preload portion 704 may be caused by contact of the integrated actuator portion 706 with the integrated preload portion 704 (e.g., via preload extension 710 which may extend into cavity 712 of the trigger 702). The change in the spring rate of the integrated preload portion 704 may be detectable by an operator of the operator control device 700.

In some embodiments, the trigger 702 and the integrated preload portion 704 may be a single part or component. For example, the trigger 702 and the integrated preload portion 704 may be formed from a single piece of elastomeric material. Further, the preload spring feature may provide additional travel space (e.g., for a finger depressing the trigger 702) and/or additional resistance in operation as the operator applies pressure to the trigger 702. The integrated actuator portion 706 may be configured to contact the integrated preload portion 704 (e.g., via preload extension 710) upon pressure being exerted on the trigger.

Figure 8:
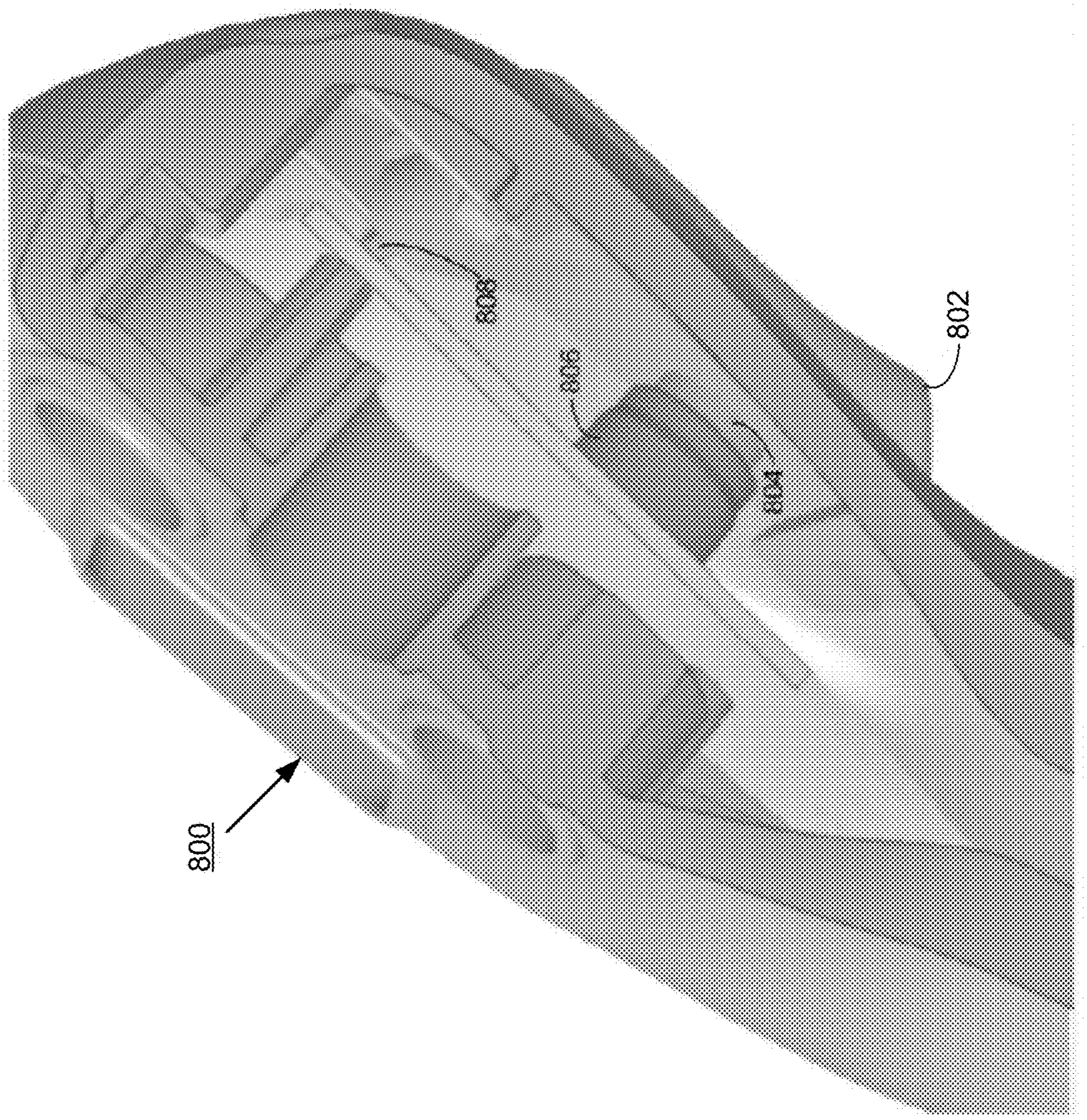

Referring to FIG. 8, a cross-sectional view of an operator control device 800 having a trigger 802 in accordance with embodiments of the present disclosure is illustrated. The trigger 802 may interact (e.g., via an integrated actuator portion 804) with a switch 806 (e.g., a pushbutton switch) of the operator control device 800. The trigger 802 may be shaped to include an extended portion (e.g., an integrated actuator portion 804) that may interact with the switch 806 before the switch 806 is actuated by the trigger 802 during operation. The extended portion (e.g., the integrated actuator portion 804) may be configured to fit, at least in part, within the switch 806. Operator applied pressure (e.g., via a finger) may cause the trigger 802 (e.g. via the integrated actuator portion 804) to interact with the switch 806 of the operator control device 800. The integrated actuator portion 804 may be configured to apply pressure to the switch 806 of the operator control device 800 upon pressure being exerted on the trigger 802 (e.g., via an operator). Further, the integrated actuator portion 804 may be configured to actuate the switch 806 of the operator control device 800 upon pressure being exerted on the trigger (e.g., via the operator).

Figure 9:
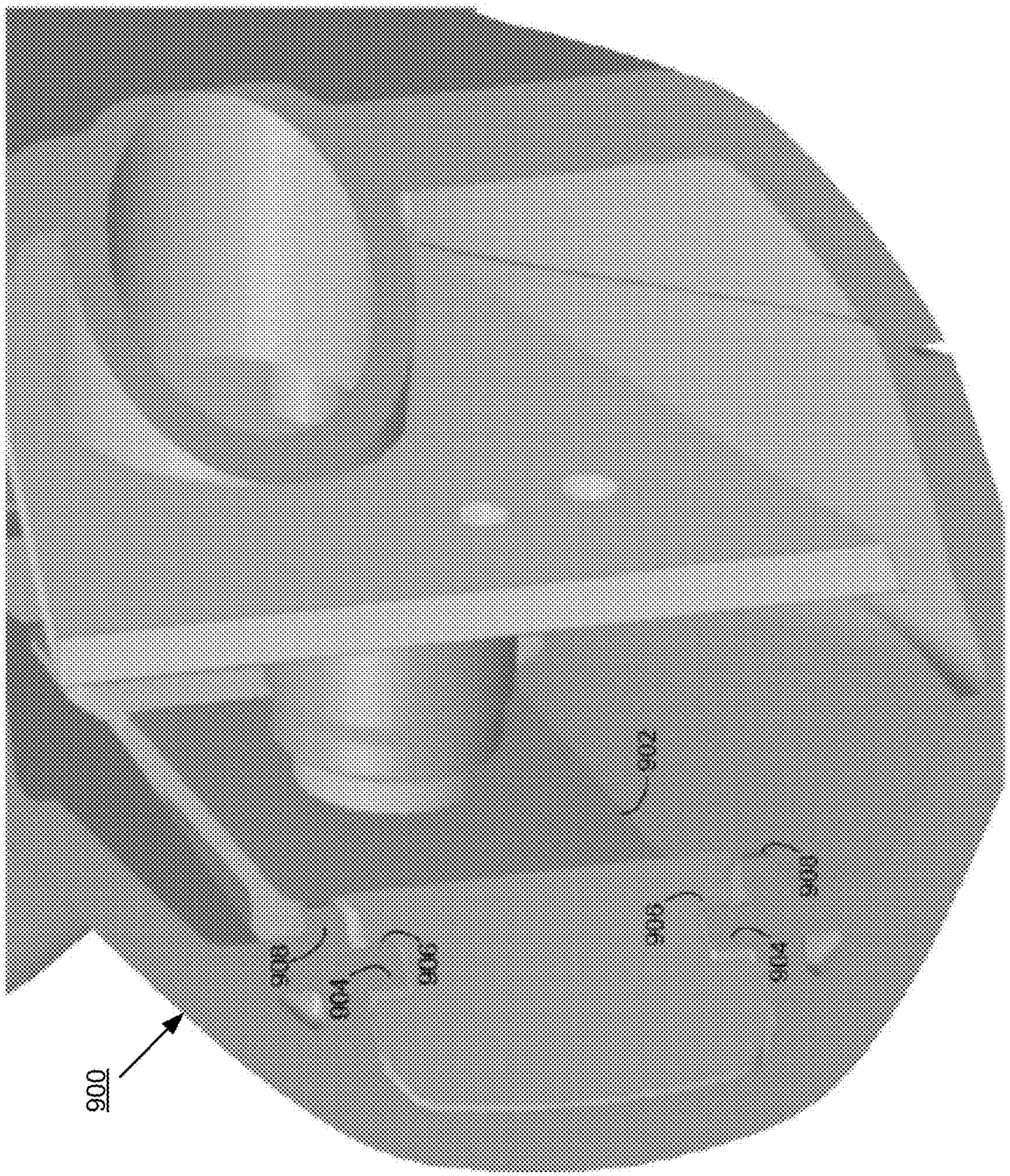
Figure 10:
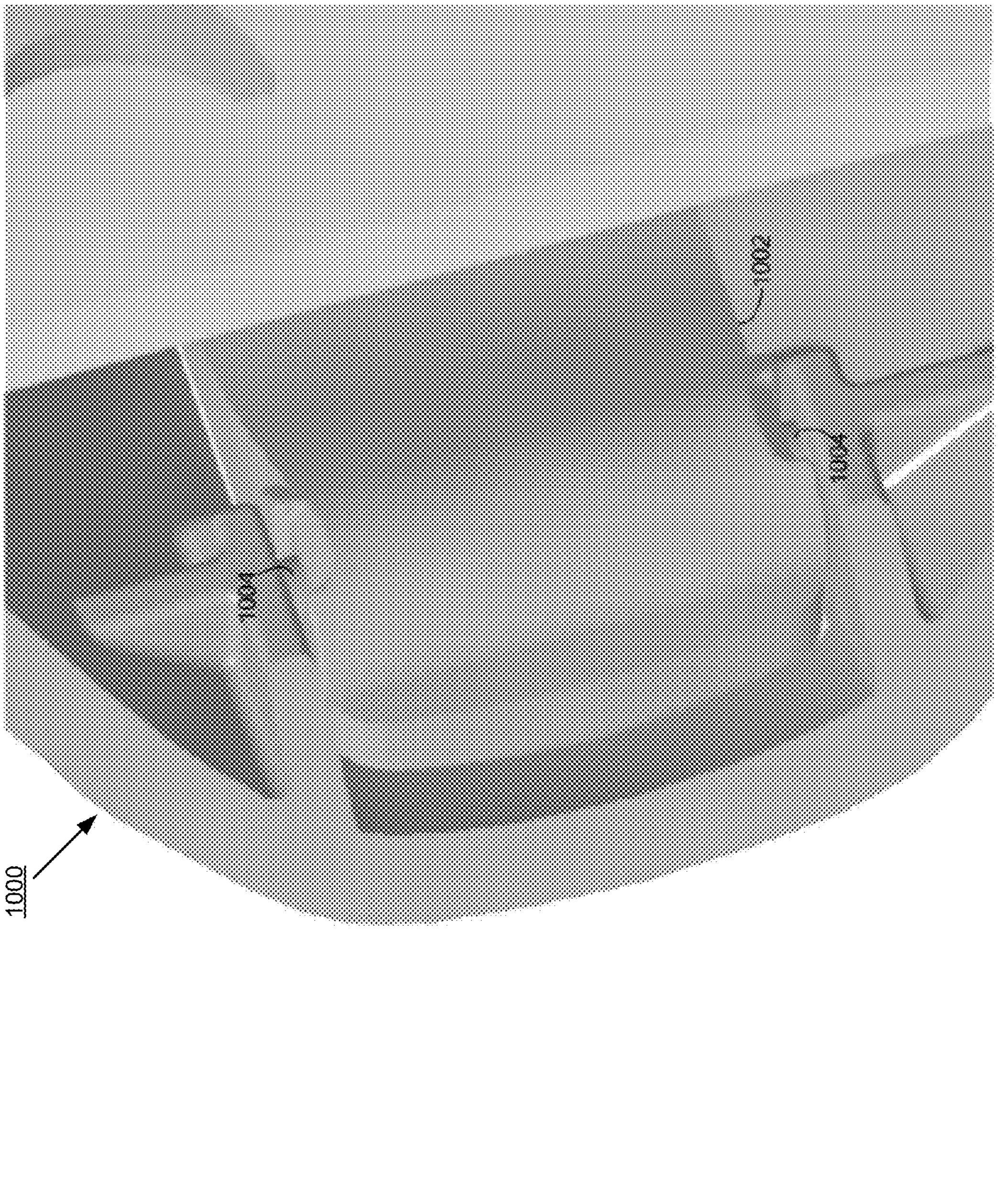

FIG. 8 also shows an axle (e.g. a pivot portion 808) of the operator control device 800, consistent with embodiments of the present disclosure. The trigger 802 or at least a portion of the trigger 802 may rotate about the axle (e.g. the pivot portion 808) during operation of the trigger 802. Referring to FIG. 9, a cross-sectional view of an operator control device 900 having a trigger 902 in accordance with embodiments of the present disclosure is illustrated. The trigger 902 may be made or formed from an elastomer and may be mated with one or more axles (e.g., pivot portions 904) via one or more mating portions which may provide snap-fit style features. One or more pivot interfaces 906 of the trigger 902 may be configured to contact and/or rotate on the one or more axles (e.g. the pivot portions 904). The operator control device 900, which may serve as a housing for the trigger 902, may include extensions 908 that may be shaped to facilitate mating with the one or more pivot interfaces 906. In some embodiments, the extensions 908 may be part of or may extend from the one or more axles (e.g. the pivot portions 904). Referring to FIG. 10, a cross-sectional view of an operator control device 1000 having a trigger 1002 in accordance with embodiments of the present disclosure is illustrated. The trigger 1002 may include one or more axles (e.g. pivot portions 1004) and an elastomer spring pivot interface, which may include a depressed portion configured to allow the trigger 1002 to pass by a housing (e.g., operator control device) extension.

Figure 11:
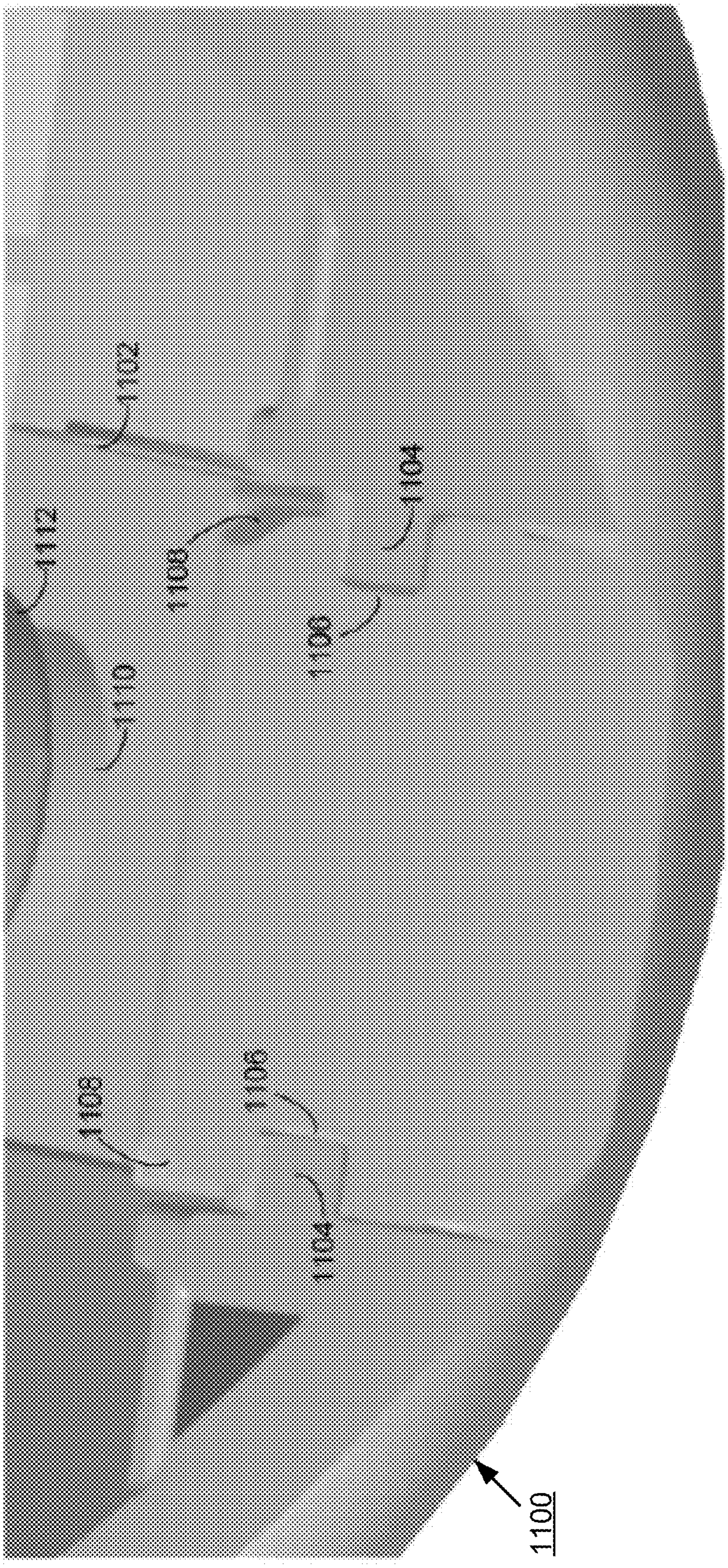

Referring to FIG. 11 a cross-sectional view of an operator control device 1100 having a trigger 1102 in accordance with embodiments of the present disclosure is illustrated. One or more integrated rotation portions 1106 of the trigger 1102 may be configured to interface with, at least in part, one or more axles (e.g., pivot portions 1104) of the operator control device 1100. The one or more axles (e.g., the pivot portions 1104) may facilitate a snap-fit style interaction with the one or more integrated rotation portions 1106 (which may include pivot interfaces such as pivot interface 612 of FIG. 6) of the trigger 1102. The trigger 1102 may include lead-in ramps 1108 that may facilitate mating of the trigger 1102 and the operator control device 1100 (e.g., where the one or more axles interface with the one or more integrated rotation portions 1106). In some embodiments, the pivot interfaces may be pressed (e.g., snapped) into place within the operator control device 1100 (e.g., within the housing for the trigger 1102) during assembly.

The one or more integrated rotation portions 1106 may be configured to allow at least a portion of the trigger 1102 to rotate around, at least in part, the one or more pivot portions 1104 (e.g., the one or more axles) of the operator control device 1100 upon the trigger 1102 being mated to the operator control device 1100. At least a first portion of the trigger 1102, the one or more integrated rotation portions 1106 (e.g., the one or more axles), an integrated actuator portion 1110, and an integrated preload portion (e.g., such as integrated preload portion 704 of FIG. 7) of the trigger 1102 may rotate upon pressure being exerted on the trigger 1102 (e.g., by an operator).

In operation, as the trigger 1102 is pressed (e.g., by the operator), the trigger 1102 may rotate around the one or more pivot portions 1104 (e.g., the one or more axles) and the integrated preload portion (e.g., the integrated preload portion 704 of FIG. 7, which may be made from silicone or another elastomer and be shaped in a web configuration) may apply force (e.g., via the integrated actuator portion 1110) to the switching element (e.g., switch 1112) at a spring rate of the integrated preload portion (which may be shaped in the web configuration). As it is pressed further, the actuator (e.g., the integrated actuator portion 1110) may contact the integrated preload portion (which may be shaped in the web configuration), which may increase a spring rate felt by the operator. The change in spring rate may act as a tactile queue to the operator and may indicate that the switch (e.g., the switch 1112) is about ready or almost in position to be activated. As the switch (e.g., the switch 1112) is pressed further, the trigger 1102, actuator (e.g., the integrated actuator portion 1110), and the integrated preload portion (which may be shaped in the web configuration) may move together around the one or more pivot portions 1104 (e.g., the one or more axles) to press the switch element (e.g., the switch 1112) until the switch changes state (e.g., activates).

Figure 12:
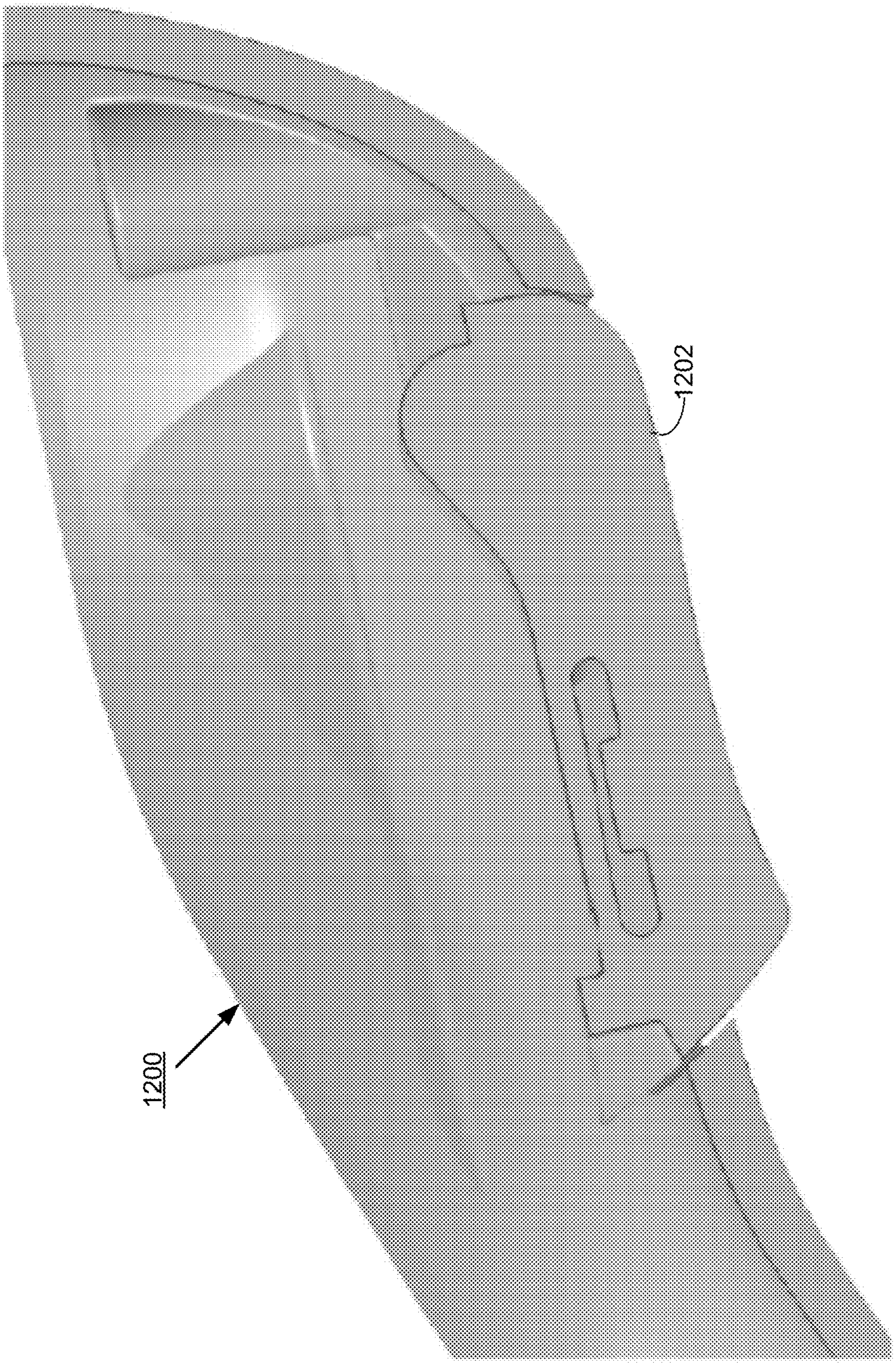
FIG. 12 illustrates a view of an example operator control device having a trigger in accordance with embodiments of the present disclosure.

Referring to FIG. 12, a view of an operator control device 1200 having a trigger 1202 in accordance with embodiments of the present disclosure is illustrated. As discussed above, the trigger 1202 may be formed from an elastomeric material. Further, an elastomeric property of the trigger 1202 may provide flexibility for the trigger 1202 to be snapped into position in a trigger opening of the operator control device 1200. The trigger 1202 may not require a separate component (e.g., screws 208 of FIG. 2) to mate with the operator control device 1200.

Figure 13:
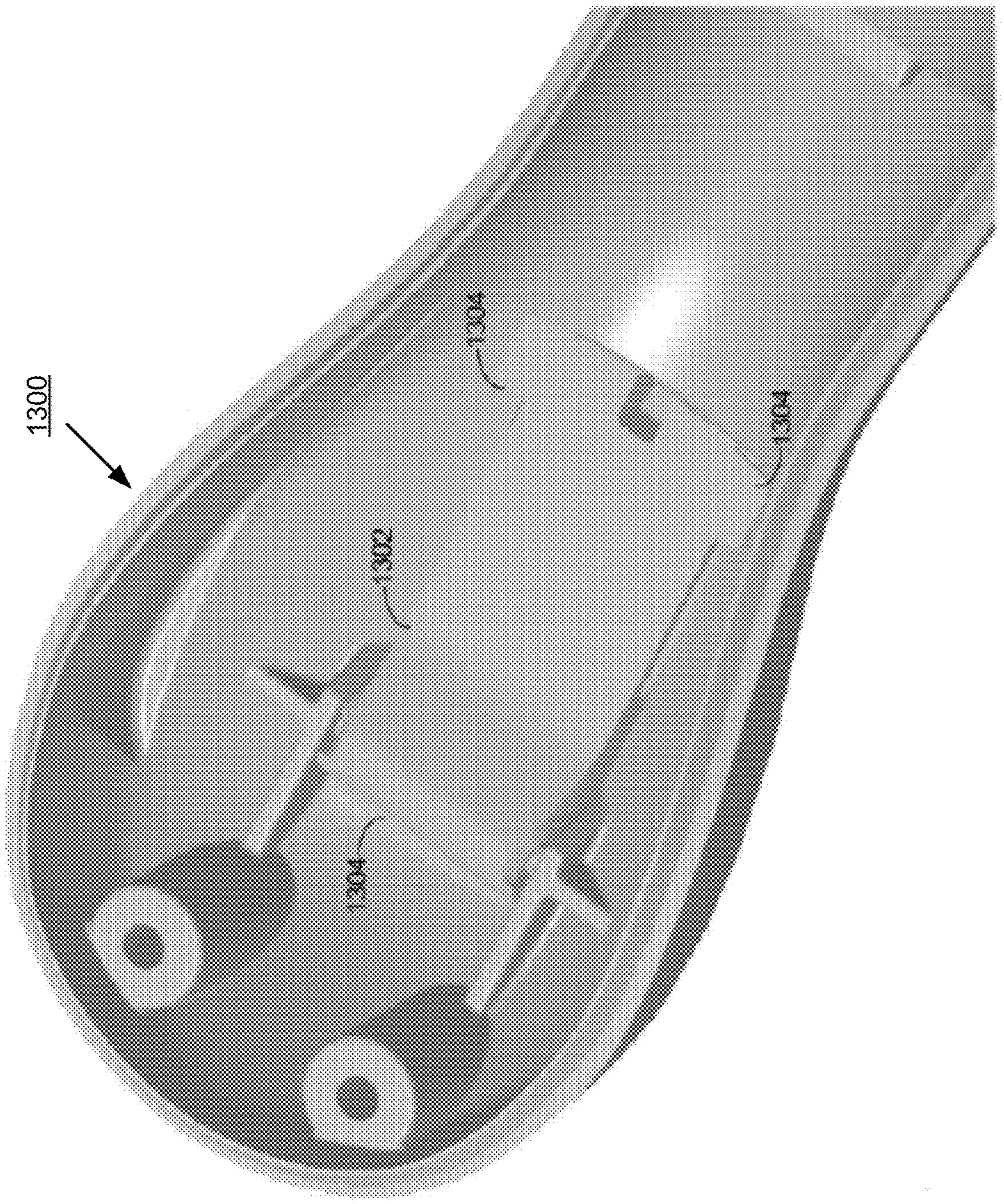
FIG. 13 illustrates an interior view of an example operator control device having a trigger in accordance with embodiments of the present disclosure.

Referring to FIG. 13, an interior view of an operator control device 1300 having a trigger 1302 in accordance with embodiments of the present disclosure is illustrated. As shown, one or more mating portions 1304 may allow for snap-fit style assembly of the trigger 1302 with the operator control device 1300. Thus, the total part count or component count for the trigger 1302 to be assembled with the operator control device 1300 may be one (i.e., the trigger 1302 itself). The trigger 1302 may fit into the operator control device 1300 such that the trigger 1302 can rotate about the one or more axles (e.g., the pivot portions 1104 of FIG. 11). Further, the trigger 1302 may have limited rotational motion capability such that the trigger 1302 may not rotate out of the housing.

Figure 14:
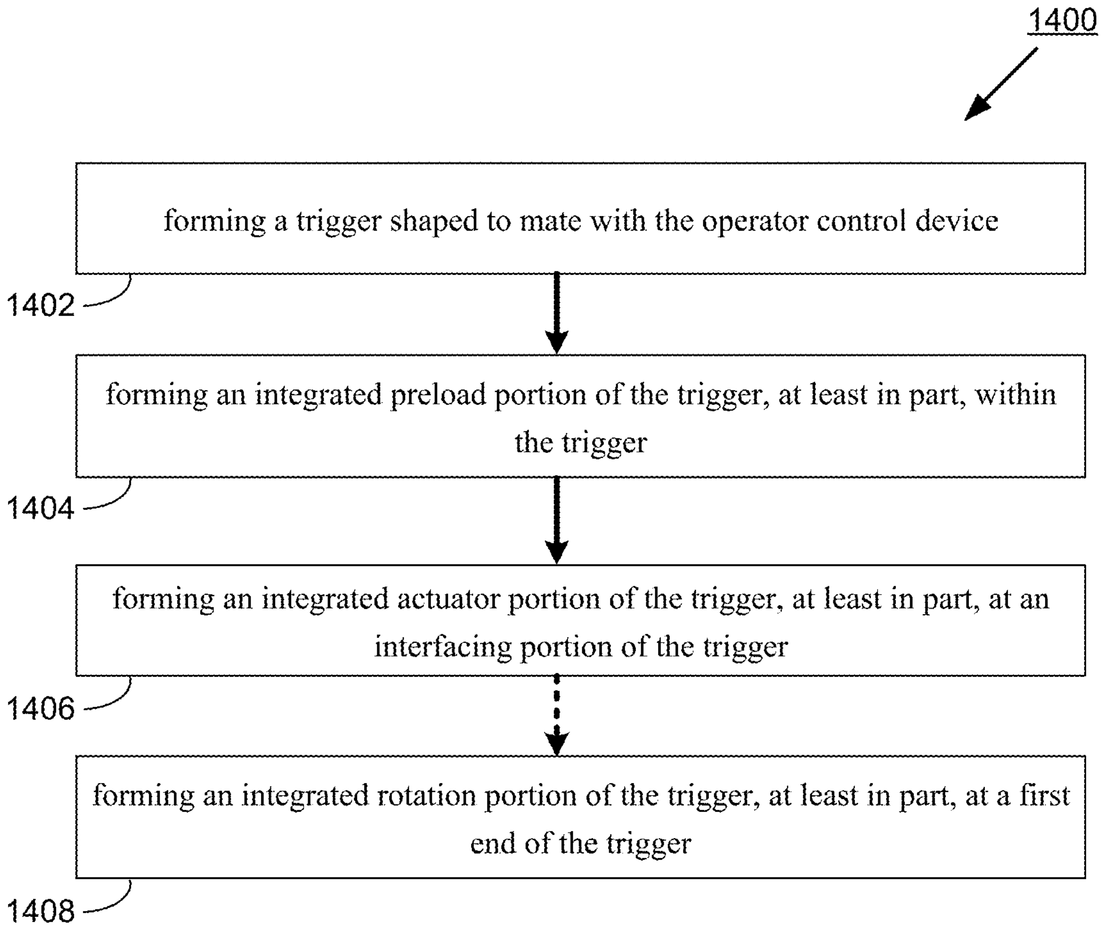
FIG. 14 is a flow chart illustrating example operations in accordance with embodiments of the present disclosure.

Referring to FIG. 14, a flow chart illustrating example operations in accordance with embodiments of the present disclosure is shown. Embodiments of the present disclosure may include methods or processes for forming an apparatus (e.g., comprising a trigger such as trigger 1102) for actuating a switch (e.g., switch 1112) of an operator control device (e.g., operator control device 1100). The triggers described herein may be formed from an elastomeric material using an extrusion process, molding process, or other process for shaping elastomers.

For example, a process 1400 for forming a trigger may include forming (1402) a trigger (e.g., trigger 1102) shaped to mate with the operator control device (e.g., operator control device 1100). The process may further include forming (1404) an integrated preload portion (e.g., the integrated preload portion 704 of FIG. 7) of the trigger (e.g., the trigger 1102), at least in part, within the trigger (e.g., the trigger 1102). The process 1400 may also include forming (1406) an integrated actuator portion actuator (e.g., the integrated actuator portion 804 of FIG. 8) of the trigger (e.g., the trigger 1102), at least in part, at an interfacing portion (e.g., interfacing portion 606 of FIG. 6) of the trigger (e.g., the trigger 1102). The integrated actuator portion (e.g., the integrated actuator portion 804 of FIG. 8) may be configured to interface with the switch (e.g., switch 806 or 1112) of the operator control device (e.g., operator control device 1100).

In some embodiments, the process 1400 may include forming (1408) an integrated rotation portion (e.g., the integrated rotation portion 610 of FIG. 6) of the trigger (e.g., the trigger 600), at least in part, at a first end (e.g., the first end 610) of the trigger (e.g., the trigger 600). The trigger 600 and the integrated preload portion (e.g., the integrated preload portion 602 of FIG. 6) may be formed from a single piece of elastomeric material. The trigger 600 may not require a separate component (e.g., screws or fasteners) to mate with the operator control device (e.g., operator control device 1100).

Using the techniques and features described herein, embodiments of the present disclosure may provide advantages over existing approaches. Such advantages may include, but are not limited to, lower cost due to fewer components in the trigger assembly, lower cost due to less expensive material (e.g., elastomers) and mold tooling for the trigger, reduced assembly time facilitated by snap-fit style features, quieter operation of the trigger, tactile feel for the operator provided by use of an elastomer to form the trigger, increased reliability, a reduction in part-to-part variation due to reduced part/component count, and simple adjustment of a pre-travel force-deflection curve. By reducing the trigger assembly part/component count from six parts (e.g., including attachment screws as discussed above with regard to FIG. 2) to one part (i.e., the trigger itself), the part cost may be reduced in some cases by approximately 91%. Further, the snap-fit style assembly for one part as compared to assembling six parts (e.g., as discussed above with regard to FIG. 2) may, in some cases, reduce assembly time by approximately 83%. Thus, the techniques and features described herein may provide both cost and operating advantages. In some embodiments, the use of an elastomer may reduce hard tooling costs, in some cases, by approximately 86% and lead time, in some cases, by 50%, which may provide faster and less expensive re-configurability for new applications.

The terminology used herein is for the purpose of describing particular embodiments and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph (f) for any limitations of any of the claims herein, except for those in which the claim expressly uses the words ‘means for’ or ‘step for’ together with an associated function.

Having thus described the disclosure of the present application in detail and by reference to embodiments thereof, it will be apparent that modifications and variations are possible without departing from the scope of the disclosure defined in the appended claims.

What is claimed is:

1. An apparatus for actuating a switch of an operator control device, comprising:

a trigger shaped to mate with the operator control device, the trigger comprising:

an integrated preload portion formed, at least in part, within the trigger; and an integrated actuator portion formed, at least in part, at an interfacing portion of the trigger, wherein the integrated actuator portion is configured to interface with the switch of the operator control device, wherein the integrated actuator portion is configured to contact the integrated preload portion upon pressure being exerted on the trigger, and wherein a change in a spring rate of the integrated preload portion is caused by the contact of the integrated actuator portion with the integrated preload portion.

2. The apparatus of claim 1, wherein the integrated actuator portion is configured to apply pressure to the switch of the operator control device upon pressure being exerted on the trigger.

3. The apparatus of claim 1, wherein the integrated actuator portion is configured to actuate the switch of the operator control device upon pressure being exerted on the trigger.

4. The apparatus of claim 1, wherein the change in the spring rate of the integrated preload portion is detectable by an operator of the operator control device.

5. The apparatus of claim 1, wherein the trigger is formed from an elastomeric material.

6. The apparatus of claim 1, wherein an elastomeric property of the trigger provides flexibility for the trigger to be snapped into position in a trigger opening of the operator control device.

7. The apparatus of claim 1, wherein the trigger and the integrated preload portion are a single part.

8. The apparatus of claim 1, wherein the trigger and the integrated preload portion are formed from a single piece of elastomeric material.

9. The apparatus of claim 1, wherein the trigger does not require a separate component to mate with the operator control device.

10. The apparatus of claim 1, further comprising:
an integrated rotation portion formed, at least in part, at a first end of the trigger.

11. The apparatus of claim 10, wherein the integrated rotation portion is configured to interface with, at least in part, a pivot portion of the operator control device.

12. The apparatus of claim 11, wherein the integrated rotation portion is configured to allow at least a portion of the trigger to rotate around the pivot portion of the operator control device upon pressure being exerted on the trigger to mate with the operator control device.

13. The apparatus of claim 12, wherein at least a first portion of the trigger, the integrated rotation portion, the integrated actuator portion, and the integrated preload portion rotates upon pressure being exerted on the trigger.

14. The apparatus of claim 1, further comprising:
a first mating portion formed at a first end of the trigger and shaped to allow the trigger to mate with the operator control device.

15. The apparatus of claim 14, further comprising:
a second mating portion formed at a second end of the trigger opposite the first end of the trigger and shaped to allow the trigger to mate with the operator control device.

16. A method for forming an apparatus for actuating a switch of an operator control device, comprising:
forming a trigger shaped to mate with the operator control device;
forming an integrated preload portion of the trigger, at least in part, within the trigger; and
forming an integrated actuator portion of the trigger, at least in part, at an interfacing portion of the trigger,
wherein the integrated actuator portion is configured to interface with the switch of the operator control device,
wherein the integrated actuator portion is configured to contact the integrated preload portion upon pressure being exerted on the trigger, and
wherein a change in a spring rate of the integrated preload portion is caused by the contact of the integrated actuator portion with the integrated preload portion.

17. The method of claim 16, further comprising:
forming an integrated rotation portion of the trigger, at least in part, at a first end of the trigger; and
wherein the trigger and the integrated preload portion are formed from a single piece of elastomeric material and the trigger does not require a separate component to mate with the operator control device.

18. An apparatus for actuating a switch of an operator control device, comprising:
a trigger shaped to mate with the operator control device, the trigger comprising:
an integrated preload portion formed, at least in part, within the trigger;
an integrated actuator portion formed, at least in part, at an interfacing portion of the trigger;
an integrated rotation portion formed, at least in part, at a first end of the trigger; and
at least one mating portion shaped to allow the trigger to mate with the operator control device,
wherein the integrated rotation portion is configured to allow at least a portion of the trigger to rotate around a pivot portion of the operator control device upon pressure being exerted on the trigger and cause the integrated actuator portion to actuate the switch of the operator control device,
wherein the integrated actuator portion is configured to contact the integrated preload portion upon pressure being exerted on the trigger, and
wherein a change in a spring rate of the integrated preload portion is caused by the contact of the integrated actuator portion with the integrated preload portion.

* * * * *